(12) United States Patent
Gray et al.

(10) Patent No.: US 10,415,213 B2
(45) Date of Patent: Sep. 17, 2019

(54) REMOTELY CONTROLLED CONSTRUCTION EQUIPMENT

(71) Applicant: Cooper Gray Robotics LLC, Berkeley, CA (US)

(72) Inventors: Justin Gray, Berkeley, CA (US); Nathan Mariels, Berkeley, CA (US)

(73) Assignee: COOPER GRAY ROBOTICS, LLC, Berkeley, CA (US)

( * ) Notice: Subject to any disclaimer, the term of this patent is extended or adjusted under 35 U.S.C. 154(b) by 0 days.

(21) Appl. No.: 15/338,101

(22) Filed: Oct. 28, 2016

(65) Prior Publication Data
US 2017/0123414 A1 May 4, 2017

Related U.S. Application Data (60) Provisional application No. 62/247,710, filed on Oct. 28, 2015.

(51) Int. Cl.
*E02F 9/20* (2006.01)
*B60L 50/50* (2019.01)
*E02F 3/34* (2006.01)
*E02F 9/22* (2006.01)

(52) U.S. Cl.
CPC ............ *E02F 9/205* (2013.01); *B60L 50/50* (2019.02); *E02F 3/3414* (2013.01); *E02F 9/2004* (2013.01); *E02F 9/207* (2013.01); *E02F 9/2235* (2013.01)

(58) Field of Classification Search
CPC .......... G05D 1/0016; G05D 2201/0202; B60L 11/18; E02F 3/3414; E02F 9/2204; E02F 9/205; E02F 9/207; E02F 9/2235
See application file for complete search history.

(56) References Cited

U.S. PATENT DOCUMENTS

| | | | | |
|---|---|---|---|---|
| 4,459,591 A * | 7/1984 | Haubner | ................ | G08C 15/12 340/12.16 |
| 5,551,524 A * | 9/1996 | Yamamoto | ............ | B62D 11/08 180/167 |
| 6,030,169 A * | 2/2000 | Rossow | ................ | B60K 28/04 180/273 |
| 6,202,014 B1 * | 3/2001 | Brandt | .................. | E02F 3/3414 172/12 |
| 6,493,616 B1 * | 12/2002 | Rossow | ................. | E02F 9/205 37/414 |
| 6,923,285 B1 * | 8/2005 | Rossow | ............... | E02F 3/3695 180/272 |
| 9,063,530 B2 * | 6/2015 | Lougheed | ............. | G05B 19/04 |
| 2001/0019224 A1 * | 9/2001 | Amano | ................... | H02J 9/002 307/10.7 |
| 2002/0070069 A1 * | 6/2002 | Brandt | ................. | E02F 9/2004 180/333 |
| 2005/0279561 A1 * | 12/2005 | Shearer | ................ | E02F 3/7663 180/333 |

(Continued)

*Primary Examiner* — Thomas E Worden
(74) *Attorney, Agent, or Firm* — Knobbe, Martens, Olson & Bear, LLP (57) ABSTRACT

A remote controlled construction vehicle that can be battery powered and have movement members and a tool. The vehicle in one implementation can have wheels and a bucket and may include redundant safety and control systems that inhibit inadvertent startup of the vehicle or tool. The safety and control systems may also disable the vehicle in response to detecting faults.

19 Claims, 8 Drawing Sheets

(56) References Cited

U.S. PATENT DOCUMENTS

| | | | |
|---|---|---|---|
| 2008/0209623 A1* | 9/2008 | Schaaf | A47K 11/02 4/449 |
| 2010/0256844 A1* | 10/2010 | Ito | B63H 21/22 701/21 |
| 2012/0323464 A1* | 12/2012 | Steen | F02D 41/0002 701/103 |
| 2014/0052350 A1* | 2/2014 | Tsuruga | E02F 3/325 701/50 |
| 2014/0263607 A1* | 9/2014 | Mindeman | G06F 17/30 235/375 |
| 2015/0365159 A1* | 12/2015 | Bosworth | G08G 5/0069 455/11.1 |

* cited by examiner

REMOTELY CONTROLLED CONSTRUCTION EQUIPMENT

BACKGROUND OF THE INVENTION

Field of the Invention

The present invention relates to remotely controlled vehicles and, in particular, concerns remotely controlled construction equipment such as skip loaders and the like.

Description of the Related Art

Remote controlled vehicles are commonly used in entertainment applications. Such devices include drones, remotely controlled airplanes, remotely controlled cars and the like. These systems typically include a control unit that communicates with a receiving unit located within the vehicle that controls the operation of the vehicle. As these devices are relatively small, safety concerns are often less of an issue and the control interface is simplified.

However, with larger construction type equipment, the control operations are not as simple as with existing hobby or novelty devices. Specifically, large construction equipment poses a considerable danger to persons and structures if the system is operating at incorrect control voltages. Moreover, safety interlocks and verifications to ensure that the device does not operate without correct settings may also be necessary for large construction equipment than with smaller devices.

Remotely controlled construction equipment is potentially of great value to the field. For example, a remotely controlled earth moving device, such as a skip loader could remove the operator from the skip loader. In some instances, operators of construction equipment can be exposed to potentially dangerous situations as a result of being positioned on the construction equipment itself. For example, if the construction equipment or vehicle overturns on uneven ground, an operator mounted on the vehicle may be injured as a result. Moreover, the simple operation of such a vehicle can pose long term health risks to the operator as the vehicles are typically rough riding and can be exhausting to the operator when operated for large periods of time.

A further issue that arises with mobile construction equipment and vehicles is that these vehicles are often powered via fossil fuel engines, e.g., diesel engines, and also often use hydraulic actuators to move the buckets etc. The hydraulic actuators are subject to damage which can result in contamination of the ground if the lines leak. Further, the fossil fuel motors also produce exhaust which can have deleterious effects on the environment. This is particularly true with vehicles that are used in enclosed spaces.

To this end, there is a need for a control system for remotely operated construction vehicles that has sufficient interfaces to enhance the safe operation of the vehicle. There is also a need for a system that is capable of controlling an electrically powered vehicle that reduces the emissions and potential contaminants to the environment. Preferably, there is also a need for a control system that can be used in multiple types of vehicles that addresses these needs.

SUMMARY OF THE INVENTION

The aforementioned needs are satisfied, at least in part, by various implementations and embodiments of the instant application which include a control system for an electrically powered construction vehicle that can include, without limitation, a skid steer, skip loader, front end loader, backhoe etc. In one implementation, the control system includes a receiver that receives signals from a control unit operated by the operator. The control unit may provide signals that direct forward or rear motion of the vehicle, that direct steering and that direct signals to operate a tool such as a bucket loader, backhoe etc. The control unit translates signals from a remote control unit to motor controllers or hydraulic controllers that control the drive mechanism of the construction vehicle and the tool operation mechanism of the vehicle.

In one implementation, the control system verifies that the operating voltage of the control system is correct before translating the incoming signals into signals that will control the operation of the motor controllers and hydraulic controllers so that the amplitude of the motor control signals are less likely to be distorted by an incorrect operating signal. The system is also set up so that if the receiver fails to produce an appropriate operating voltage the system shuts down and does not send additional signals to the motor controllers. The system can also be set up so that the when commands are output to the motor controllers and the motor controllers fail to interpret the signal, the system defaults to a hold state. The system can also be configured so that interlocks ensuring that the user is correctly positioned must be closed before signals are transmitted to the motor controllers.

In one implementation, the system receives pulse input signals that are translated into dual switch output signals which can then be used to produce a pulse width modulation (PWM) signal. In this way, the magnitude of the PWM signal can be modified between a low and a high value due to the timing of the input pulse signals. This provides greater control over the operation of the motor controller and consequently, more accurate control over the movement of the construction vehicle and the operation of the tools. In one implementation, the inputs to the motor controllers are optically isolated from the input signals and the conversion system so that inadvertent feedback signals are less likely to result in erroneous signals being transmitted to the motor controllers.

These and other objects and advantages will become more apparent from the following description taken in conjunction with the accompanying drawings.

DETAILED DESCRIPTION OF ONE EMBODIMENT

Figure 1A:
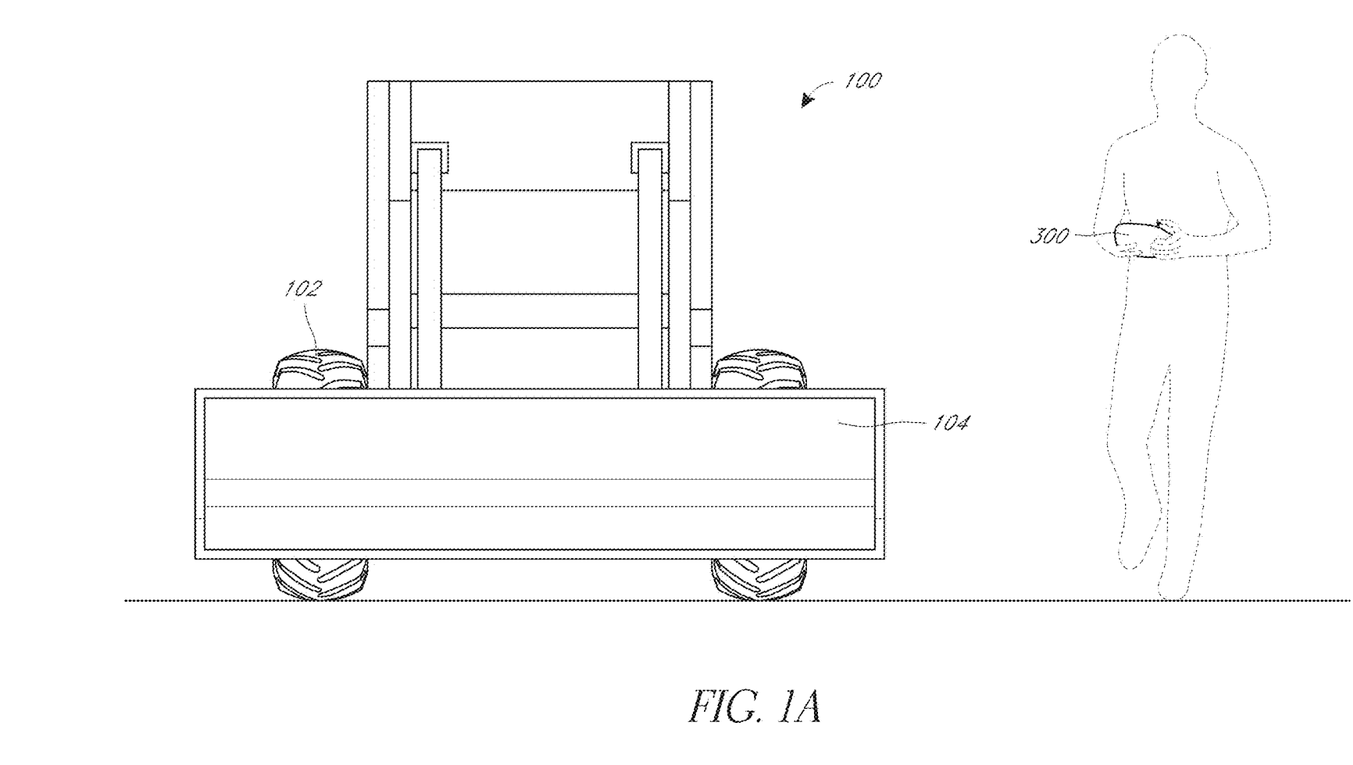
FIGS. 1A and 1B illustrate an exemplary embodiment of a remote controlled construction vehicle with a tool.
Figure 1B:
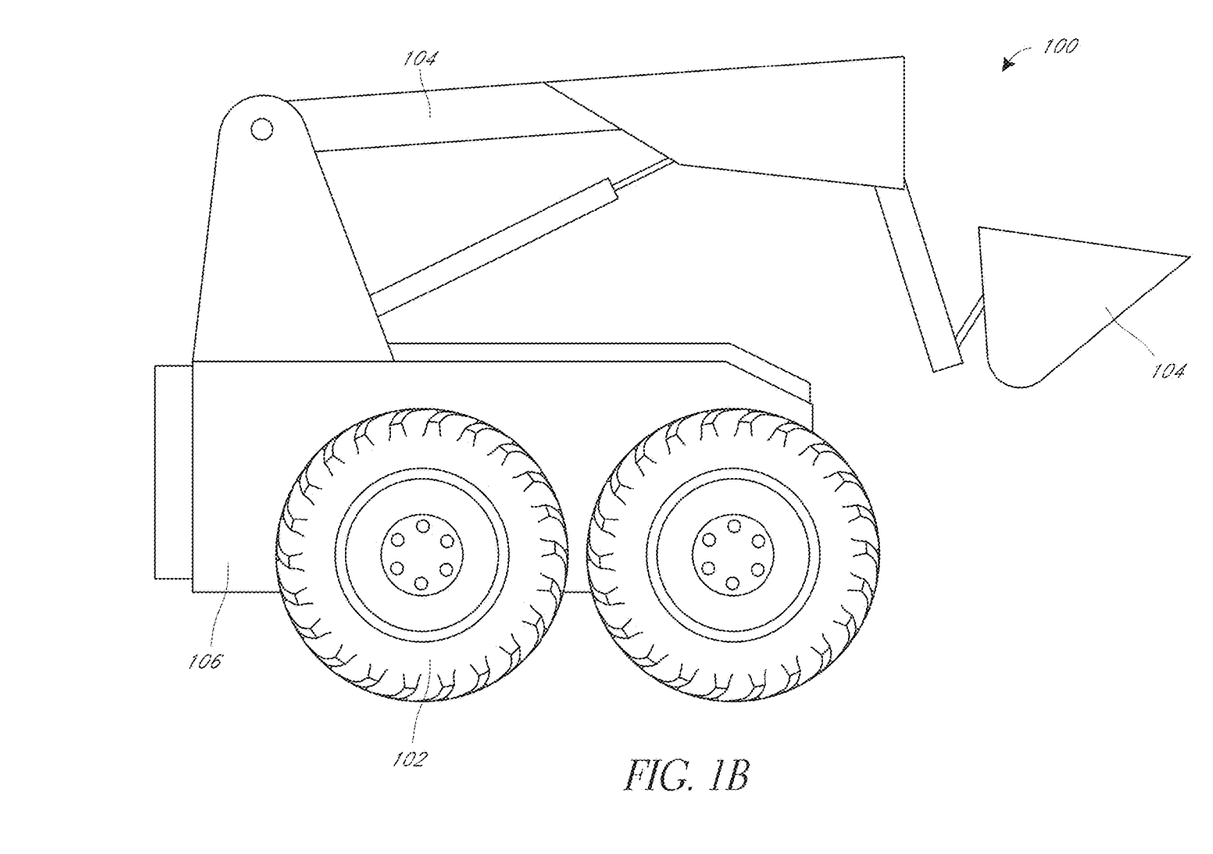

Reference will now be made to drawings where like numerals refer to like parts throughout. FIGS. 1A and 1B illustrate an exemplary construction vehicle 100 with a drive mechanism 102 and a tool 104. In this non-limiting example, the vehicle 100 comprises a skid steer loader with two sets of independently controlled wheels for movement of the vehicle 100 and a loading bucket 104. The loading bucket 104 may be either hydraulically actuated or electrically actuated as will be described in greater detail below. The vehicle 100 also includes a chassis 106 that contains both the control system and the electrical power system. In this implementation, the bucket 104 may be raised and lowered and the angle of the bucket 104 can also be rotated in a manner that is well understood in the art. In this way, the vehicle 100 comprises a loader that is capable of digging holes, moving dirt and debris and the like.

Figure 2A:
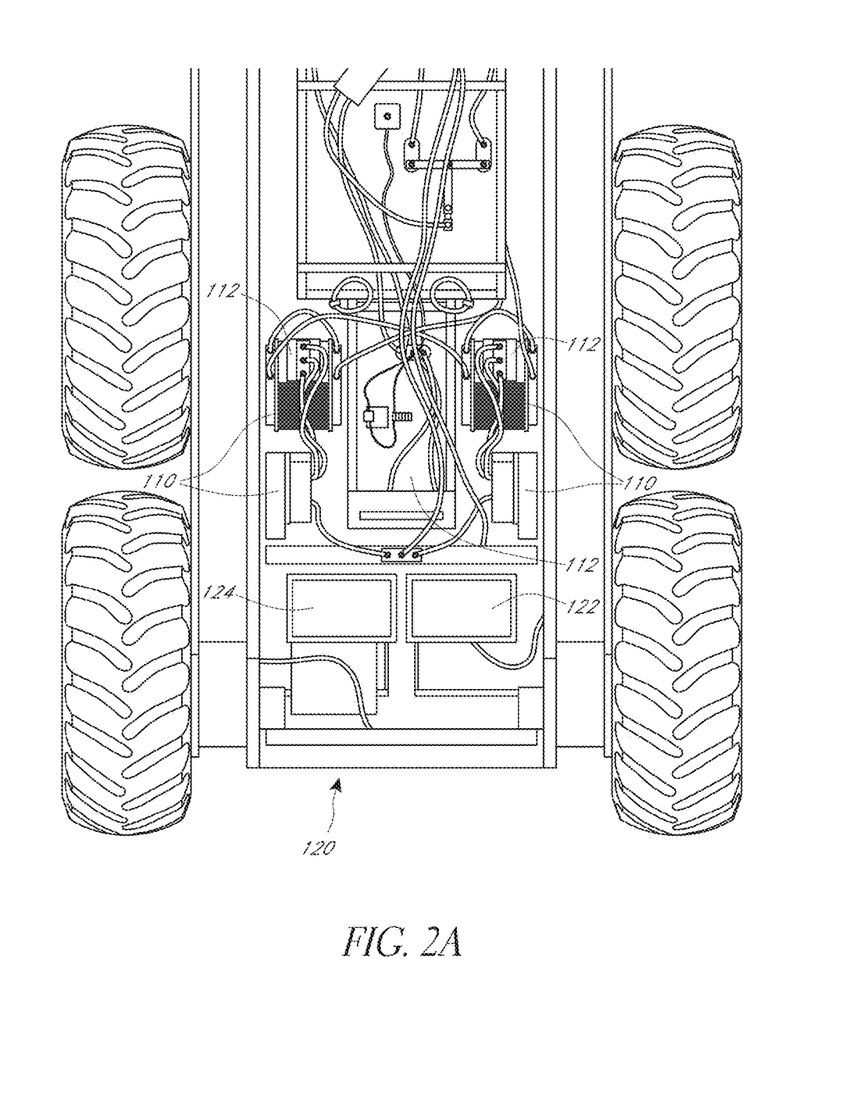
FIGS. 2A-2B illustrate one possible mounting location of batteries and motor controllers for the vehicle of FIGS. 1A and 1B.
Figure 2B:
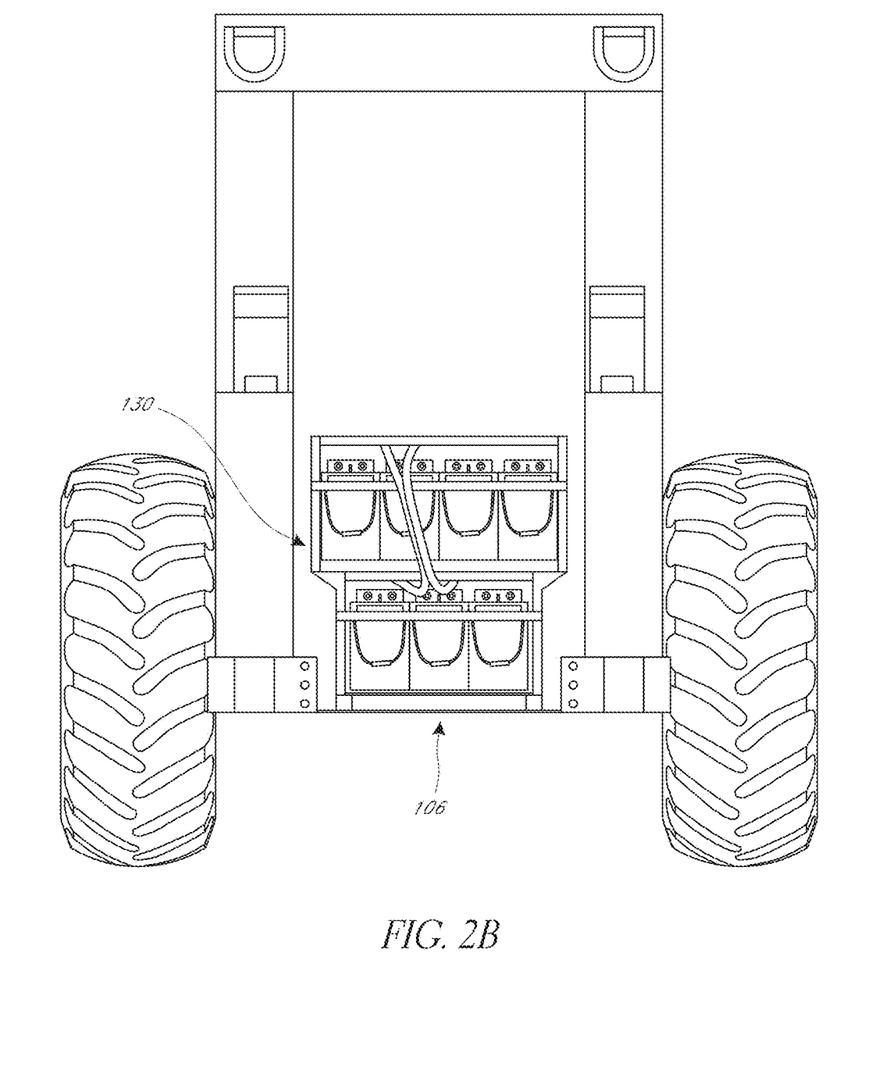

More specifically, as shown in FIGS. 2A-2B, the chassis 106 includes motor controllers 110 that provide electrical power to electrical motors to control the operation of wheels and drive mechanism 102. In one exemplary implementation, the motor controllers comprise Sevcon Gen4 48Vvdc 450A for Brushless PM Motors that control DLC-28 Brushless 15 kW Cont./38 kW Pk. Liquid-Cooled PMAC Motor 48vdc type motors but the system need not be limited to these devices and other devices may be used without departing from the spirit and scope of the present teachings.

The motor controllers 110 are advantageously located on the side walls of the chassis compartment with a motor 112 locate in the central portion. As shown in FIG. 2B, control units 120 are positioned in the central portion of the chassis and these control units 120 include a conversion unit 122 and a local unit 124 which will be described in greater detail below.

FIG. 2B illustrates that a plurality of batteries 130 may be installed at the rear of the chassis 106. Preferably, the batteries are located rearward of the tool or bucket 104 so that the batteries can be used to counter balance the bucket 102 when the bucket is lifting heavy objects. The batteries 130 are preferably rechargeable batteries that power the drive system and potentially the tool so that the system can operate without or at least with less fossil fuels or hydraulic fluid. As is shown in FIG. 2B, the batteries 130 are preferably stacked in a T-shaped configuration with more batteries 130 being on the top row than on the bottom row. This provides additional space for the routing of cables and the like.

Figure 3:
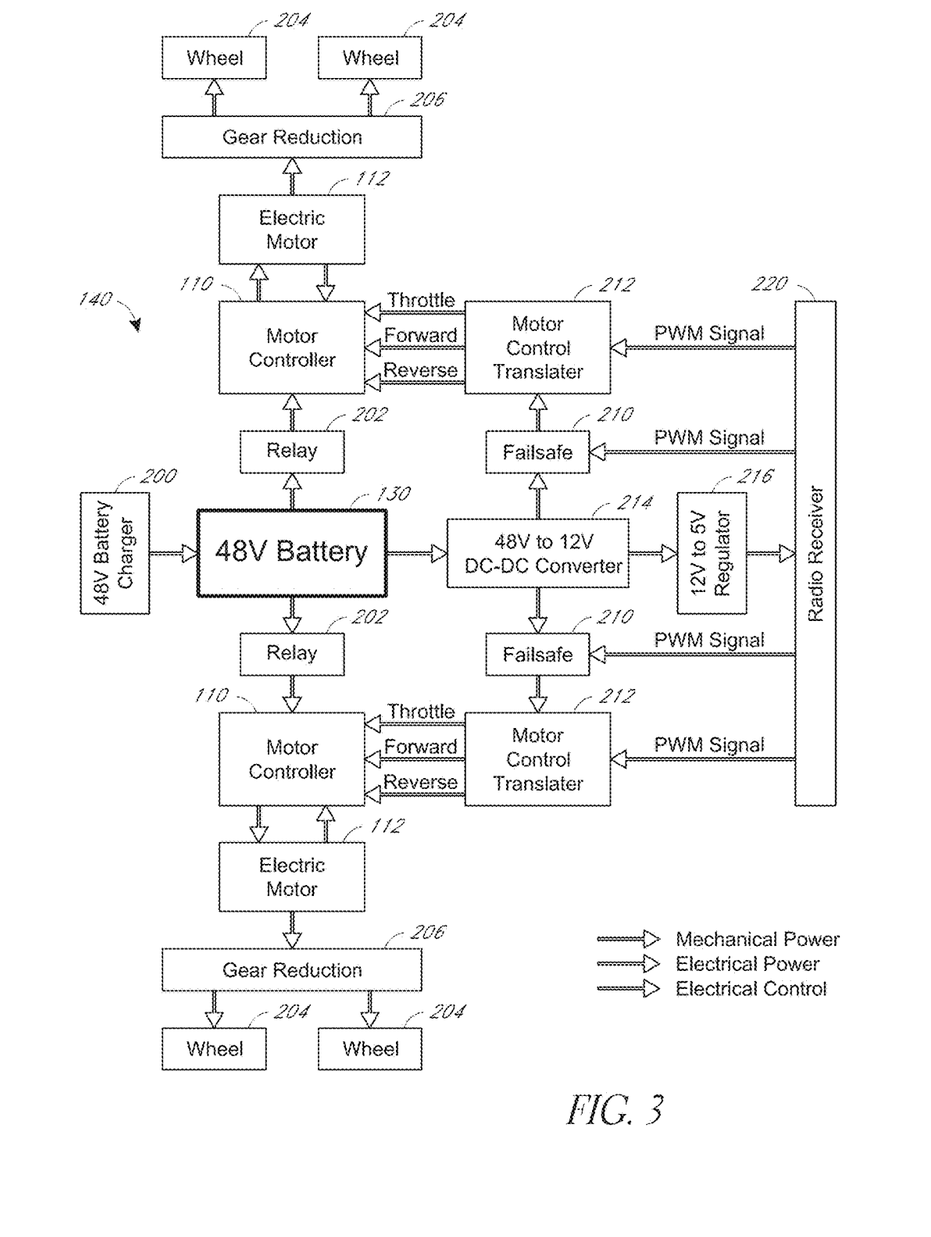
FIG. 3 is a block diagram of the remote controlled vehicle.

FIG. 3 is a schematic drawing of the remote controlled vehicle. As shown, there are the batteries 130 that power the vehicle 100. These batteries can be charged by a battery charger 200 and provide power to the electric motor 112 via a relay 202 and the motor controllers 110. The electric motors 112 then provide forward and backward power to the wheels 204 via a gear reduction assembly 206 in a well understood manner. The motor controller 110 is provided power and is controlled via motor control translator 212 and a fail/safe functionality 210 that ensures more safe operation of the vehicle in a manner that will be described in greater detail below and is implemented in software but can be implemented in hardware, firmware and the like. The system also incorporates power converters 214 and 216 that provide 12 volts of power and 5 volts of power respectively to the fail/safe 210 and motor control translators 212 and a radio receiver 220.

As shown, the radio receiver 220 receives RF signals from the hand controller 300 that is carried by the operator. In one implementation, the signals received are standard 0 or 5 volt signals that have 1 to 2 mS pulse duration and are sent approximately 18 mS apart. The length of the signals dictate whether the user is causing various wheels of the vehicle to move forward or backward and the speed at which the wheels will turn. In one non-limiting application, a 1.5 mS signal is a stationary signal and signals having a duration above that are forward motion and signals having a duration below that are reverse direction. Two sets of signals are transmitted possibly on two separate channels, one for each set of wheels 204 to thereby permit the vehicle to move forward, backwards and turn by varying the speed and direction of each of the sets of wheels. The signals are then translated into a Pulse Width Modulated (PWM) signal via software and are then used by the motor control translator 212 to provide throttle, forward and reverse signals to the motor controller 110 to control the direction of the wheels.

Figure 4:
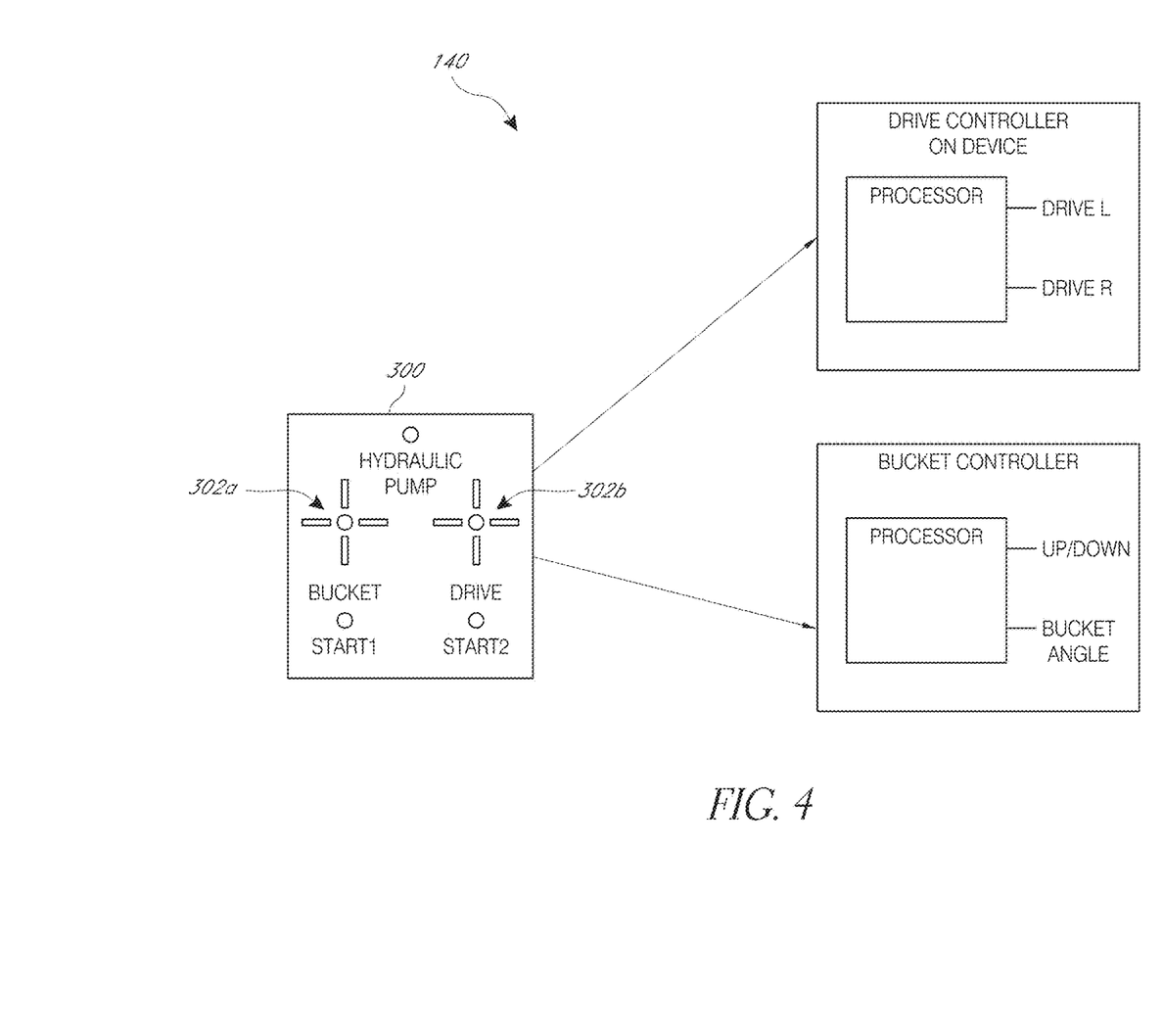
FIG. 4 is a block diagram of one possible implementation of a control interface for the vehicle of FIGS. 1A and 1B that is adaptable to additional vehicles.

FIG. 4 is another schematic diagram of the control system 140 that is positioned within the control units 122 and 124 as well as a hand held controller 300 that is held by the operator of the vehicle 100. The control unit 122 in one implementation is designed to receive incoming RF signals and translate these signals into signals that the motor controllers 110 could then interpret to drive the system. Similarly, control signals for the operation of the tool 102 may be translated into either signals for solenoids to control a hydraulic version of the tool 102 or signals to control electric motor controllers for the tool depending upon the implementation.

As shown, the system 140 receives a two channel RF input from a standard remote controller 300 for remote vehicles which is then decoded into pulse width modulated signals to provide a high accuracy of signal to the motor controllers 110. In one implementation, narrow width signals are transmitted via the RF device and are then translated into broader band pulse width signals.

In one implementation, the output signals to the motor controllers are preferably optically isolated using optical diodes. In this way, errant signals from the motor controllers are less likely to be fed back to the system 140 to thereby affect the magnitude of subsequent signals being transmitted. This reduces the potential for the system to move or move the tool in manners that are inconsistent with the received control signals.

As shown, the hand held controller 300 includes two start switches START 1 and START 2 that are used as a failsafe system to inhibit inadvertent startup of the construction vehicle 100. It will be appreciated that the construction vehicle is a large heavy vehicle so extra care to inhibit inadvertent movement of the vehicle must be taken to provide a greater level of safety. The failsafe start up procedure using these two start buttons will be described in greater detail below.

The system also includes two joystick controls 302a, 302b one for controlling the drive system 102 and one for controller the tool 104. The joystick control 302a for the drive system permits forward and reverse motion by moving the joystick backwards and forwards and turning motion by toggling the joystick 302a left and right. Similarly, the joystick 302b permits the user to lift the bucket 104 up and down by moving the joystick 302b forwards and backwards and tilt the angle of the bucket 104 by moving the joystick left and right. Each of the controls is sent via different channels to reduce the possibility that the control signals for one device does not affect the other device. As is also shown, the controller 300 can also have a switch that enables a hydraulic pump for the bucket 104 if the bucket is hydraulically operated. It will be appreciated, that various other controls and indicators can also be provided on the remote control unit 300 without departing from the spirit or scope of the present invention.

As is also shown, the RF signals are then received by a drive controller functionality 320 and a bucket or tool controller functionality 322 that are separate from each other and are part of the control system 140. One or more processors 324 then implement the functionality described previously to cause the vehicle to move and operate the tool and provide the output signals to the various left and right drive 102 and the tool 104.

As discussed above, the safe operation of the vehicle is important as the vehicle is a large piece of construction equipment which can easily cause damage or injury if inadvertently started. To avoid this, fail safe functionality is implemented by the control system to inhibit inadvertent erroneous startup of the system. Initially, the vehicle itself may have a kill switch on the vehicle that has to be enabled to begin to operate the vehicle. The remote control 300 also has the two separate start switches START 1 and START 2. The control system 140 implements a startup functionality to inhibit inadvertent startup of the vehicle that is illustrated in one non-limiting example in the flow chart of FIG. 5. As shown, from a start state 400, the control system then checks the status of the START 1 switch in state 402. The control system continues to monitor the status of START 1 until the control system determines in decision state 404 that the switch is closed.

Figure 5:
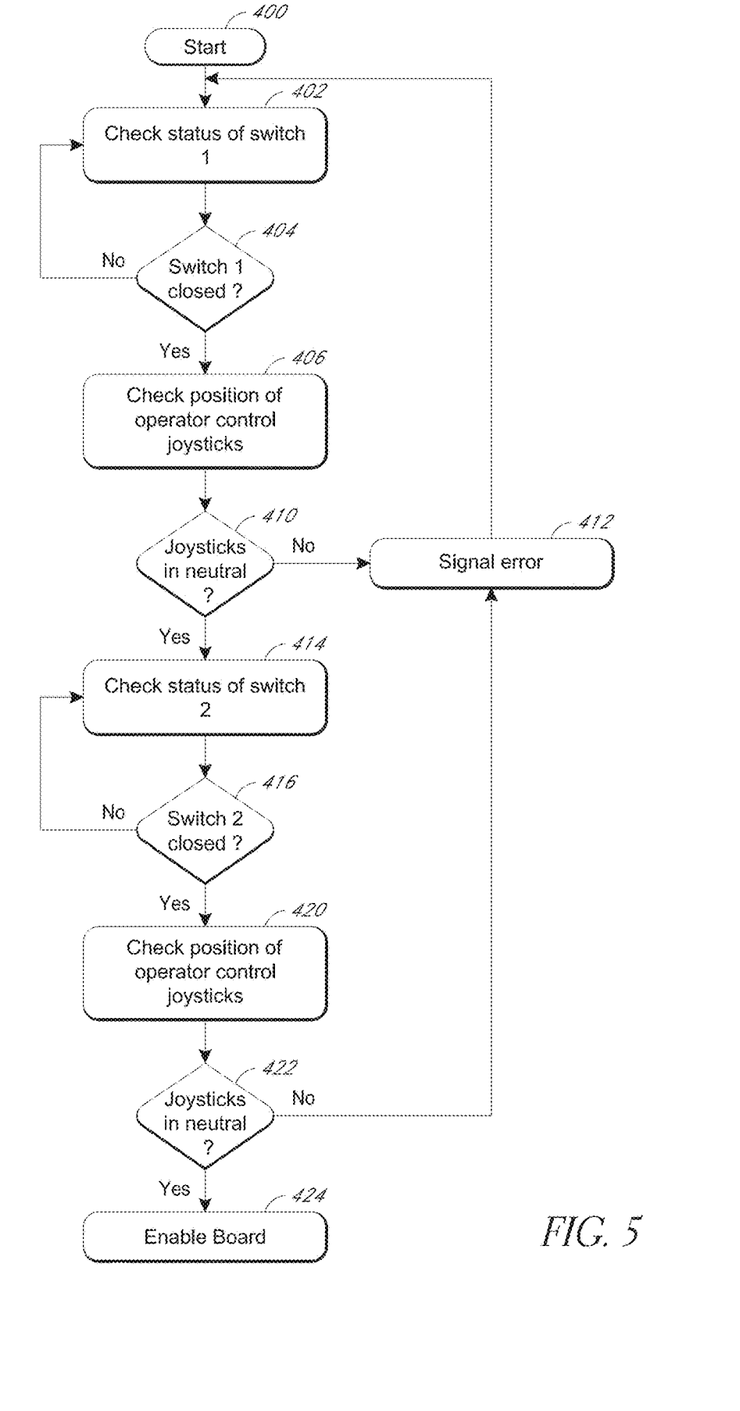
FIG. 5 is a flow chart illustrating an interlock system for initiating the operation of the remote controlled construction vehicle.

Once START 1 is closed, the control system then monitors, in state 406, the position of the drive and bucket joysticks 302a, 302b to ensure that they are in the neutral position, e.g., the 1.5 mS position indicating that neither the vehicle or tool is going to move. The control system then decides in decision state 410 if the joysticks are in the neutral position. If they are not in the neutral position, the control system 140 then provides an error signal in block 412, potentially as a flashing light or similar device on the remote control 300 and then disables the system returning to the start state 400. In this way, the vehicle and the tool don't suddenly move upon start up.

If the system 140 then determines that the joysticks are in the neutral position in decision state 410, then the system begins monitoring the state of the START 2 switch in state 414. To fully start up the vehicle, the user must engage both start switches START 1 and START 2. If the system determines in decision state 416 that the switch START 2 has been activated, the system again checks the position of the joysticks in state 420 to ensure that the vehicle is not going to suddenly move. Similarly, if the system decides in decision state 422 that the joysticks are not in the neutral positions, the system 140 then provides an error signal and disables the startup sequence. The control system 140 will power the board in state 424, enabling operation of the vehicle and the tool attached to the vehicle, only after redundant checks to confirm that the control joysticks are in the neutral position.

Figure 6:
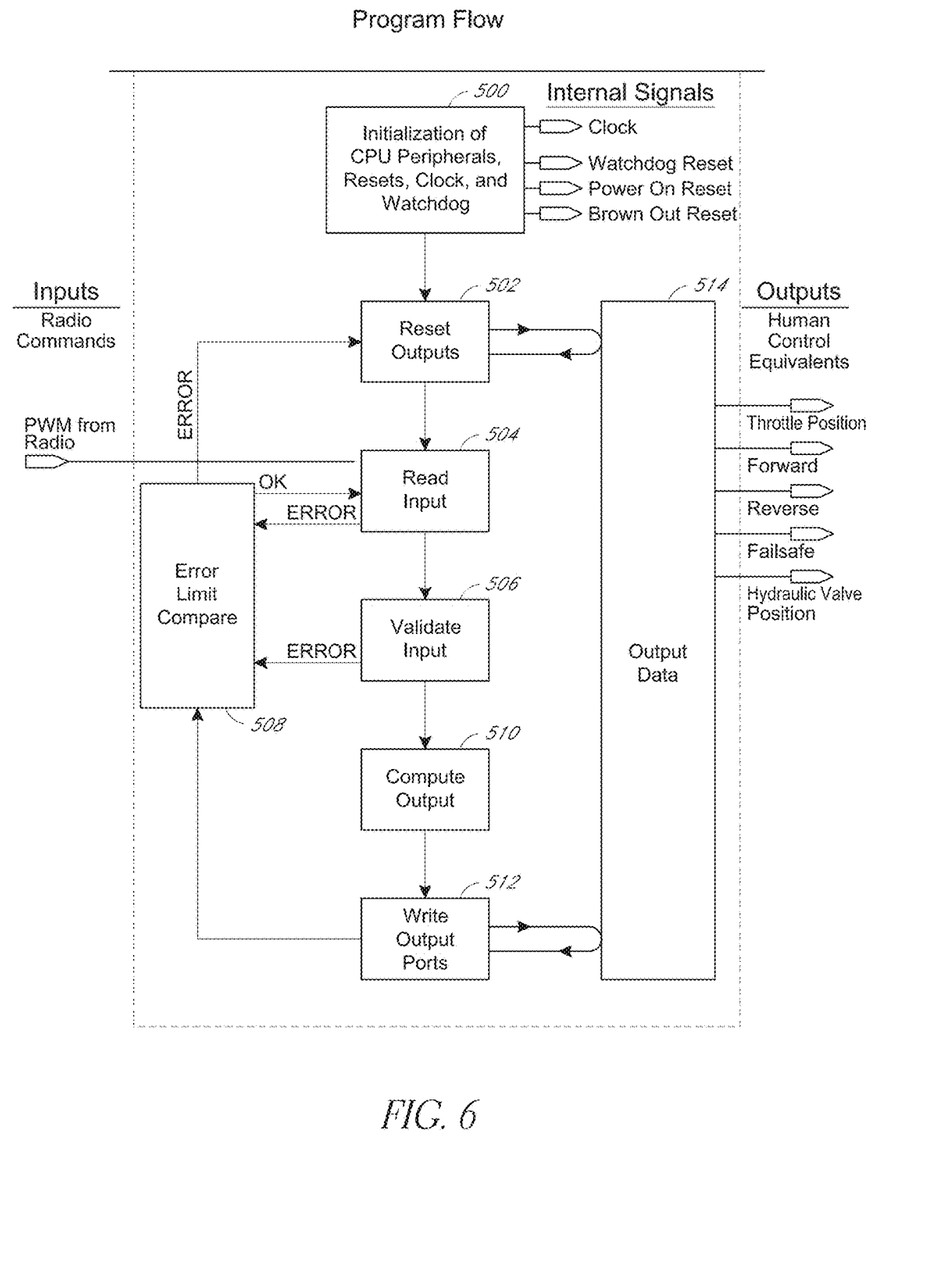
FIG. 6 is a flow chart illustrating one exemplary method of operation of the control interface of FIG. 3 during operation of the remote controlled vehicle.

FIG. 6 is an exemplary flow diagram that illustrates how the control system 140 operates to translate RF signals into signal that the motor controllers for the drive or control system for the tool can use. In an initialization state 500, the CPU, peripherals, Clock etc. are all set which initializes the output signals to that is transmitted to the downstream controllers for the drive and tool. The output signals include a clock signal, a watchdog reset, a power on reset and a brown out reset. Any of these conditions causes the control system 140 to disable the vehicle and reset the outputs in state 502 and require the user to perform the redundant start of sequence of FIG. 5. This reset also halts movement of the vehicle and the tool such that these conditions are less likely to result in unintended operation of the vehicle or the tool. Reset of the output signals occurs when there is a brown out of power in the system to inhibit the system operating at below power conditions which could result in inaccurate signals being transmitted to the downstream controllers.

Once the internal system 140 is stabilized, then radio commands received from the hand held controller 300 are then continuously read and error checked in states 504 and 506 and 508. If the signals are out of range or otherwise indicate an error, then the output signals to the drive and tool controllers are reset which results in the control system 140 halting operation of the vehicle and tool and requiring the user to restart the system in the manner described above in FIG. 5. In this way, inaccurate or spurious signals received by the system are less likely to result in erroneous operation of the system. Similarly, the signals received are validated to ensure that the incoming signals are in an appropriate format.

Once the incoming signals are checked and validated, the signals are then translated into signals in state 510 that control the operation of the motor controllers or tool controllers and is written to the output ports in state 512 and provided as output data 514. The output can then be written to the output ports where information such as throttle position, direction of drive and control of the tool (e.g., hydraulic valve position) can be sent to the downstream controllers to control the operation of the vehicle 100. A further output data is the transmission of a fail/safe signal.

Thus, the system is designed to continuously evaluate the incoming signals to see if the signal are corrupted which could result in inadvertent operation of the vehicle and tool and halt the vehicle and tool if such signals are detected. Similarly, power levels of the batteries can also be monitored to determine if the power level has dropped below a set amount or if there is some indication that the power level can result in inaccurate operation of the vehicle and tool. In this way, the control system 140 can attempt to inhibit inadvertent movement or tool operation of a large piece of construction equipment.

The foregoing description describes and illustrates one exemplary embodiment of the present invention. It will, however, be appreciated that various changes to the form, substance, operation, implementation and use of the present teachings may be made by those skilled in the art without departing from the spirit and scope of the present teachings. As such, the scope of the present teachings should not be limited to the foregoing, but should be defined by the appended claims.

What is claimed is:
1. A construction vehicle comprising:
a chassis;
movement members attached to the chassis to permit movement of the chassis;
a construction tool attached to the chassis;
a plurality of batteries that provide power to at least one electric motor that moves the movement members and the construction tool; and
a control system associated with the vehicle,
wherein the control system comprises an interlock system and user interface equipment,
wherein the user interface equipment permits user control of the movement members and the construction tool,
wherein the user interface equipment comprises first and second user interface devices activated in order to startup the construction vehicle,
wherein the interlock system is configured to prevent startup of the construction vehicle when the user interface equipment is not in a state associated with holding the movement members stationary at the time of activation of the first user interface device,
wherein the interlock system is configured to prevent startup of the construction vehicle when the user interface equipment is not in the state associated with holding the movement members stationary at the time of activation of the second user interface device, and
wherein, the interlock system is configured to prevent powered movement of the movement members and the construction tool when the interlock system prevents startup of the construction vehicle, at least until both the first and second user interface devices are in a de-activated state.

2. The construction vehicle of claim 1, wherein the construction vehicle is a skid steer, wherein the movement members comprise wheels driven by the at least one electric motor, and wherein the construction tool comprises a bucket driven by the at least one electric motor.

3. The construction vehicle of claim 1, wherein the plurality of batteries are located at an end of the chassis opposite the construction tool.

4. The construction vehicle of claim 1, wherein the control system further comprises:
a first joystick that controls forward, reverse, and turning motions of the movement members; and
a second joystick that controls raising, lowering, and tilting of the construction tool.

5. The construction vehicle of claim 1, wherein the at least one electric motor comprises a first electric motor that drives a first one of the movement members, a second electric motor that drives a second one of the movement members, and a third electric motor that moves the construction tool.

6. The construction vehicle of claim 1, wherein the at least one electric motor drives a hydraulic pump and wherein the hydraulic pump provides hydraulic power to the construction tool.

7. The construction vehicle of claim 1, wherein the construction tool comprises a construction tool selected from the group consisting of: a hydraulically actuated construction tool receiving hydraulic fluid from an electrically driven hydraulic pump, an electrically actuated construction tool, a backhoe, a hydraulically actuated bucket, and an electrically actuated bucket.

8. The construction vehicle of claim 1, wherein the first and second user interface devices comprise first and second start switches, respectively.

9. The construction vehicle of claim 1, wherein the control system only permits powered movement of the movement members or the construction tool when both the first and second user interface devices are activated.

10. The construction vehicle of claim 1, wherein the state of the user interface equipment associated with holding the movement members stationary is also associated with holding the construction tool stationary such that the interlock system is configured to prevent startup of the construction vehicle when, at the time of activation of either the first or second user interface device, the user interface equipment is not in the state associated with holding the movement members and the construction tool stationary.

11. The construction vehicle of claim 4, wherein the first and second joysticks each have a respective neutral position, wherein the interlock system is configured to prevent startup of the construction vehicle when at least one of the first and second joysticks is not in its respective neutral position at the time of activation of the first user interface device, and wherein the interlock system is configured to prevent startup of the construction vehicle when at least one of the first and second joysticks is not in its respective neutral position at the time of activation of the second user interface device.

12. A construction vehicle comprising:
a chassis;
movement members attached to the chassis to permit movement of the chassis;
a construction tool attached to the chassis;
a plurality of batteries that provide power to at least one electric motor that moves the movement members and the construction tool; and
a control system associated with the vehicle,
wherein the control system comprises an interlock system and user interface equipment,
wherein the user interface equipment permits user control of the movement members and the construction tool,
wherein the user interface equipment comprises first and second user interface devices activated in order to startup the construction vehicle,
wherein the interlock system is configured to prevent startup of the construction vehicle when the user interface equipment is not in a state associated with holding the movement members stationary at the time of activation of the first interface device,
wherein the interlock system is configured to prevent startup of the construction vehicle when the user interface equipment is not in the state associated with holding the movement members stationary at the time of activation of the second user interface device,
wherein the control system monitors a level of power available from the plurality of batteries,
wherein the control system is configured to lock powered movement of the movement members and the construction tool when the control system determines that power from the plurality of batteries has been lost or a level of power available from the plurality of batteries has dropped below a predetermined threshold, and
wherein the control system is configured to require, whenever powered movement of the movement members and the construction tool are locked, the first and second user interface devices be in a de-activated state and then require activation of both the first and second user interface devices before movement of the movement members and the construction tool are unlocked.

13. The construction vehicle of claim 12, wherein the control system comprises a radio-frequency remote control unit that includes the first and second user interface devices and that has separate controls for the movement members and the construction tool.

14. A construction vehicle comprising:
a chassis;
movement members attached to the chassis to permit movement of the chassis;
a construction tool attached to the chassis;
a plurality of batteries positioned within the chassis and configured to provide power to at least one electric motor that moves the movement members and the construction tool; and
a control system associated with the construction vehicle,
wherein the control system comprises an interlock system and user interface equipment that permits user control of the movement members and the construction tool, wherein the user interface equipment comprises first and second user interface devices activated in order to startup the construction vehicle, wherein the chassis has a front end and a back end, wherein the construction tool is located forward of the front end and the plurality of batteries are positioned at the back end of the chassis, wherein the interlock system is configured to prevent startup of the construction vehicle when the user interface equipment is not in a state associated with holding the movement members stationary at the time of activation of the first user interface device, wherein the interlock system is configured to prevent startup of the construction vehicle when the user interface equipment is not in the state associated with holding the movement members stationary at the time of activation of the first user interface device, wherein the control system monitors a level of power available from the plurality of batteries, wherein the control system is configured to lock powered movement of the movement members and the construction tool when the control system determines that power from the plurality of batteries has been lost or a level of power available from the plurality of batteries has dropped below a predetermined threshold, and wherein the control system is configured to require, whenever powered movement of the movement members and the construction tool are locked, the first and second user interface devices be in a de-activated state and then require activation of both the first and second user interface devices before powered movement of the movement members and the construction tool are unlocked.

15. The construction vehicle of claim 14, wherein the construction vehicle is a skid steer, wherein the movement members comprise wheels driven by the at least one electric motor and wherein the construction tool comprises a bucket driven by the at least one electric motor.

16. The construction vehicle of claim 14, wherein the control system comprises a radio-frequency remote control unit that includes the first and second user interface devices and that has separate controls for the movement members and the construction tool.

17. The construction vehicle of claim 14, wherein the control system further comprises:

a first joystick that controls forward, reverse, and turning motions of the movement members; and a second joystick that controls raising, lowering, and tilting of the construction tool.

18. A method of operating a construction vehicle comprising movement members that permit movement of the construction vehicle and that are electrically powered, a construction tool that is electrically powered, a plurality of batteries that provide power to at least one electric motor that moves the movement members and the construction tool, and a control system comprising first and second user interface devices that are activated during startup of the construction vehicle, wherein the control system further comprises user controls coupled to the movement members and the construction tool, the method comprising:

detecting, with the control system, activation of the first user interface device;

upon detecting activation of the first user interface device, preventing, with the control system, startup of the construction vehicle when the user controls are not in a state associated with holding the construction tool stationary;

detecting, with the control system, activation of the second user interface device;

upon detecting activation of the second user interface device, preventing, with the control system, startup of the construction vehicle when the user controls are not in the state associated with holding the construction tool stationary;

monitoring, with the control system, a level of power available from the plurality of batteries;

detecting, with the control system, that the level of power available from the plurality of batteries has dropped below a predetermined threshold; and upon detecting that the level of power available from the plurality of batteries has dropped below the predetermined threshold, disabling powered movement of the movement members and the construction tool at least until the first and second user interface devices are both in a de-activated state.

19. The method of claim 18, wherein the user controls comprise at least one joystick and wherein the at least one joystick must be in a neutral position in order for the user controls to be in the state associated with holding the construction tool stationary.

* * * * *